(12) United States Patent
Zhang et al.

(10) Patent No.: US 9,565,306 B2
(45) Date of Patent: Feb. 7, 2017

(54) FILTERING AN AUDIO SIGNAL FOR A NON-REAL-TIME RECIPIENT

(71) Applicant: LENOVO (Singapore) PTE, LTD., New Tech Park (SG)

(72) Inventors: Jianbang Zhang, Raleigh, NC (US); John Weldon Nicholson, Cary, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 285 days.

(21) Appl. No.: 14/085,566

(22) Filed: Nov. 20, 2013

(65) Prior Publication Data

US 2015/0140972 A1     May 21, 2015

(51) Int. Cl.
| | |
|---|---|
| *H04M 1/64* | (2006.01) |
| *H04M 3/493* | (2006.01) |
| *H04W 4/12* | (2009.01) |
| *G10L 21/00* | (2013.01) |
| G10L 17/00 | (2013.01) |
| G10L 21/0272 | (2013.01) |

(52) U.S. Cl.
CPC ............ *H04M 3/4936* (2013.01); *G10L 21/00* (2013.01); *H04W 4/12* (2013.01); G10L 17/00 (2013.01); G10L 21/0272 (2013.01); H04M 2201/41 (2013.01)

(58) Field of Classification Search
CPC .................................................. H04M 3/4936
See application file for complete search history.

(56) References Cited

U.S. PATENT DOCUMENTS

| | | | | |
|---|---|---|---|---|
| 7,113,572 | B2* | 9/2006 | Holmes | H04M 1/27 379/88.14 |
| 7,227,883 | B2* | 6/2007 | Tellado | H04L 25/03006 370/286 |
| 7,366,231 | B2* | 4/2008 | Tellado | H04B 3/32 375/219 |
| 7,610,016 | B2* | 10/2009 | Schmitt | H04M 1/6091 379/420.01 |
| 7,630,488 | B2* | 12/2009 | Picha | H04M 3/487 370/352 |
| 8,023,402 | B2* | 9/2011 | Roberts | H04B 10/60 370/210 |
| 8,023,584 | B2* | 9/2011 | Zerbe | H04L 25/03038 375/229 |
| 8,031,862 | B2* | 10/2011 | Ida | H04M 3/2236 379/390.03 |
| 8,270,845 | B2* | 9/2012 | Cheung | H04B 10/2581 359/618 |
| 8,605,737 | B2* | 12/2013 | Paetsch | H04M 7/125 370/401 |
| 9,083,798 | B2* | 7/2015 | Cross | H04M 3/4938 |
| 2003/0021394 | A1* | 1/2003 | Krack | H04M 3/533 379/88.01 |
| 2005/0134307 | A1* | 6/2005 | Stojanovic | H04L 25/028 326/31 |
| 2012/0140797 | A1* | 6/2012 | Malkin | H04B 3/237 375/219 |

\* cited by examiner

*Primary Examiner* — Joseph T Phan
(74) *Attorney, Agent, or Firm* — Kunzler Law Group

(57) ABSTRACT

For filtering an audio signal for a non-real-time recipient, a signal module may detect communication of an audio signal to the non-real-time recipient. A management module may filter the audio signal with a high-latency audio filter.

13 Claims, 8 Drawing Sheets

FILTERING AN AUDIO SIGNAL FOR A NON-REAL-TIME RECIPIENT

FIELD

The subject matter disclosed herein relates to filtering an audio signal and more particularly relates to filtering an audio signal for a non-real-time recipient.

BACKGROUND

Description of the Related Art

Electronic audio signals are often filtered to improve clarity. Some audio signals are directed to non-real-time recipients such as a voicemail system.

BRIEF SUMMARY

An apparatus for filtering an audio signal for a non-real-time recipient is disclosed. The apparatus may include a processor and a memory. The memory may store program code comprising a signal module and a management module. The signal module may detect communication of an audio signal to a non-real-time recipient. The management module may filter the audio signal with a high-latency audio filter. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
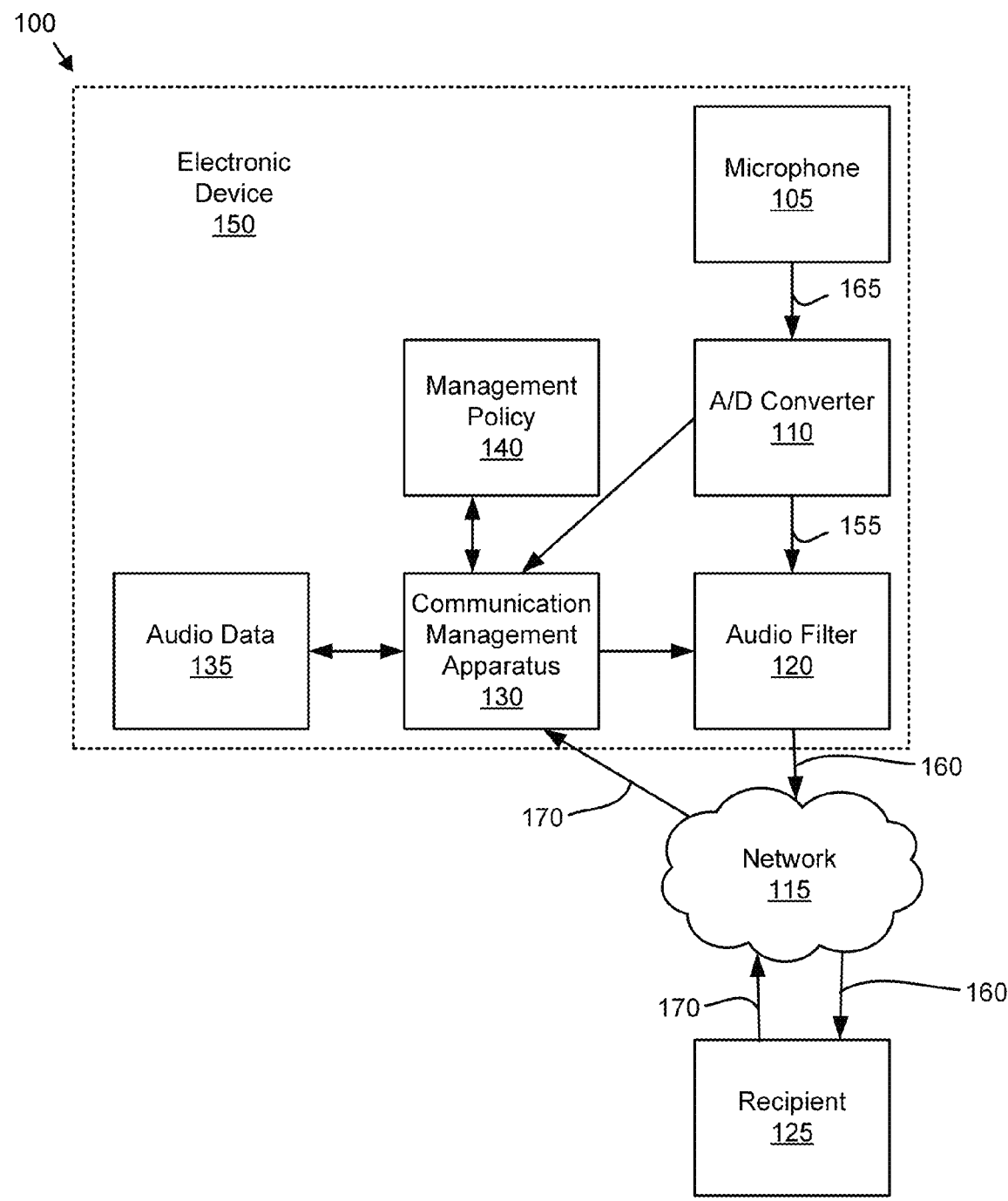
FIG. 1 is a schematic block diagram illustrating one embodiment of an audio system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a schematic block diagram illustrating one embodiment of an audio system 100. The audio system 100 includes an electronic device 150, a network 115, and a recipient 125. In the depicted embodiment, the electronic device 150 includes a microphone 105, an analog-to-digital converter 110, an audio filter 120, a communication management apparatus 130, audio data 135, and a management policy 140.

The electronic device 150 receives an audible signal such as speech at the microphone 105. The microphone 105 generates an analog signal 165. The analog-to-digital converter 110 converts the analog signal 165 into a digital audio signal 155. The audio signal 155 may be filtered by the audio filter 120. The filtered audio signal 160 may be communicated over a network 115 to a recipient 125.

The network 115 may be the Internet, a mobile telephone network, a Wi-Fi network, a local area network, a wide area network, a Bluetooth network, or combinations thereof. The electronic device 150 may communicate with the recipient 125 over the network 115. For example, the electronic device 150 may be a mobile telephone. The electronic device 150 may receive a received audio signal 170 from the recipient 125 and transmit a filtered audio signal 160 of the speech over the network 115 to the recipient 125.

The audio signal 155 may be filtered by the audio filter 120 to improve the clarity of the filtered audio signal 160. For example, the audio filter 120 may improve the signal-to-noise ratio of the filtered audio signal 160. Unfortunately, filtering the audio signal 155 delays the transmission of the filtered audio signal 160 over the network 115 to the recipient 125.

When the recipient 125 is a person, significant delays that are added to the filtered audio signal 160 are noticeable and annoying. However, some recipients such as voice mail systems or speech recognition systems, referred to herein as non-real-time recipients 125, are not adversely impacted by an increased delay in transmitting the filtered audio signal 160. As a result, there is time for the audio filter 120 to further filter the audio signal 155, even if the latency of the filtered audio signal 160 is increased.

The embodiments described herein detect communication of the filtered audio signal 160 to a non-real-time recipient 125. In addition, the embodiments filter the audio signal 155 with a high-latency audio filter 120 in response to detecting the non-real-time recipient 125.

In the depicted embodiment, the communication management apparatus 130 monitors the audio signal 155. In addition, the communication management apparatus 130 may employ the audio data 135 and the management policy 140 to detect the communication of the audio signal 155 to the non-real-time recipient 125. In response to detecting the communication of the audio signal 155 to the non-real-time recipient 125, the communication management module 130 may cause the audio filter 120 to filter the audio signal 155 with a high-latency audio filter as will be described hereafter. As a result, the clarity of the filtered audio signal 160 may be greatly improved.

Figure 2:
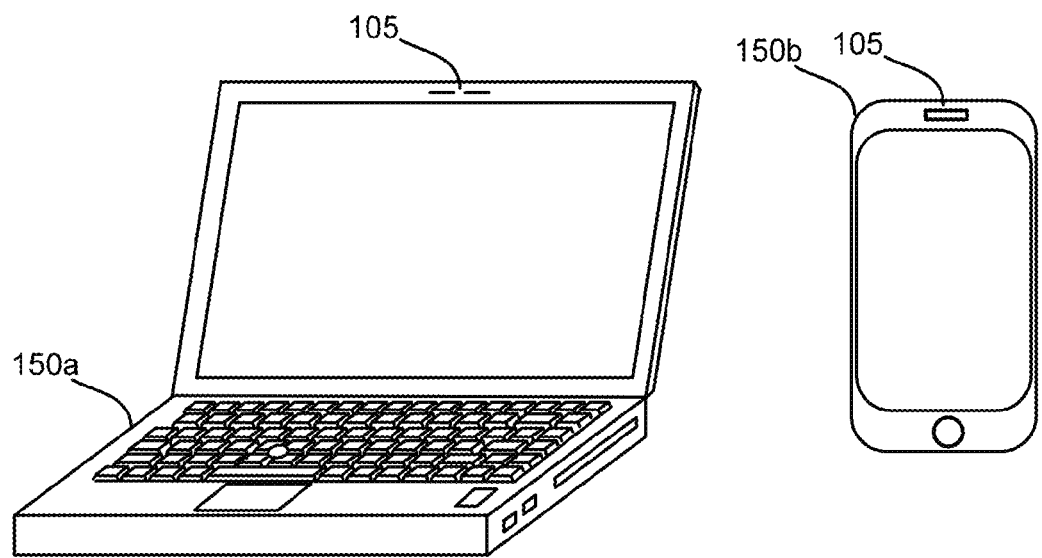
FIG. 2 is a drawing illustrating embodiments of electronic devices.

FIG. 2 is a drawing illustrating embodiments of electronic devices 150. The electronic devices include a laptop computer 150a and a mobile telephone 150b. In alternative embodiments, the electronic device 150 may be a tablet computer, and eyeglass computer, a wearable computer, a server, or the like. Each electronic device 150 may include a microphone 105 and/or microphone array 105.

Figure 3A:
FIG. 3A is a schematic block diagram illustrating one embodiment of audio data.
Figure 3B:
FIG. 3B is a schematic block diagram illustrating one embodiment of speaker data.

FIG. 3A is a schematic block diagram illustrating one embodiment of the audio data 135. In the depicted embodiment, the audio data 135 includes automation phrases 205, change indicators 210, recipient addresses 260, and speaker data 220. The audio data 135 may be stored as database entries, linked data structures, a flat file, or combinations thereof. The audio data 135 may be stored in a memory as will be described hereafter.

The automation phrases 205 include phrases that are commonly spoken by non-real-time recipients and/or spoken to non-real-time recipients. The voice speaking the automation phrases 205 may be a human voice, either of a sender speaking through the electronic device 150, or of the recipient 125. However, the automation phrases 205 may indicate that the recipient 125 is an automated system and may further indicate the recipient status. Non-real-time recipients 125 may include but are not limited to voicemail accounts, messaging systems, speech recognition systems, and automated phone menus. Table 1 includes exemplary automation phrases 205. One of skill in the art will recognize that other automation phrases 205 may be employed to detect a non-real-time recipient 125.

TABLE 1

| Phrase | Spoken by | Recipient status |
|---|---|---|
| Please leave a message | Recipient | Voicemail |
| Welcome to | Recipient | Voicemail/speech recognition system |
| Voicemail | Recipient | Voicemail |
| Please enter or say | Recipient | Automated phone menu |
| Comma | Sender | Speech recognition system |
| Period | Sender | Speech recognition system |
| Um | Recipient | Real-time recipient |

The automation phrases 205 may be stored as speech. In one embodiment, the automation phrases 205 may be stored as standard dialect phonemes. Alternatively, the automation phrases 205 may be stored as text.

The change indicators 210 may indicate a change of speaker. The change indicators 210 may be used to detect a change from a first primary speaker to a second primary speaker. Detecting the change may be used to modify a speaker identification filter to preserve second primary speaker signals from the second primary speaker so that first primary speaker signals are removed by the speaker identification filer rather than the second primary speaker signals. The change indicators 210 may be verbal cues. The verbal cues may include a personal name or pronoun indicating a second primary speaker. In addition, the verbal cues may be identified from the context of the speech.

Alternatively, the change indicators 210 may be motion cues. For example, the motion of handing a mobile telephone from one speaker to another speaker may be a change indicator. In one embodiment, the change indicator is a change in relative amplitude of a first primary speaker audio signal and a second primary speaker audio signal. Table 2 lists exemplary change indicators 210. One of skill in the art will recognize that the embodiments may be practiced with other change indicators 210.

TABLE 2

| Change indicatr 210 | Type |
|---|---|
| "Here's [name or pronoun]" | Verbal |
| "Let me put [name or pronoun] on" | Verbal |
| Mobile phone translating 50 to 100 centimeters while rotating from within 45 degrees of vertical to within 30 degrees of horizontal and rotating back to within 45 degrees of vertical | Motion |
| Mobile phone translating greater than 100 centimeters. | Motion |
| Ratio of second speaker signal amplitude to first speaker signal amplitude greater than 1.1 | Relative Amplitude |

The recipient addresses 260 may be telephone numbers, messaging identifiers, Universal Resource Locators (URL), or the like. A recipient 125 may be identified as always a non-real-time recipient 125. For example, all calls to a voicemail system will reach a non-real-time recipient 125. The address for such an always non-real-time recipient 125 may be stored in the recipient addresses 260 and used to identify the non-real-time recipient 125.

The speaker data 220 may be used to identify a specific speaker and may include entries for a plurality of speakers. The audio data 135 may be used to identify whether the recipient 125 is a non-real-time recipient 125 or real-time recipient 125. For example, a voicemail system speaker may identify the recipient 125 as a non-real-time recipient 125. In addition, the audio data 135 may be used to identify the speaker and may be used to identify the change of speakers as will be described hereafter.

3B is a schematic block diagram illustrating one embodiment of the speaker data 220. In the depicted embodiment, the speaker data 220 includes phonemes 235, prosodic attributes 240, device identifiers 245, a frequency profile 250, a vocabulary histogram 255, and a recipient type 265.

The phonemes 235 may store selected phonemes that are representative of the speaker's speech. In one embodiment, the phonemes 235 include all recorded phonemes from the speaker. Alternatively, the phonemes 235 may include selected, commonly used phonemes. The phonemes 235 may be used to identify of the speaker.

The prosodic attributes 240 may describe rhythms, stresses, and intonations of the speaker's speech. The prosodic attributes 240 may be used with the phonemes 235 to identify the speaker. Alternatively, the prosodic attributes 240 may be used independently to identify the speaker.

The device identifiers 245 may identify electronic devices 150 used by the speaker. The speaker may be identified from an identification of the electronic device 150.

The frequency profile 250 may be a frequency transform such as a fast Fourier transform of the speaker speech. The frequency profile 250 may be compared to a frequency transform of the audio signal 155 to identify the speaker.

The vocabulary histogram 255 may be a histogram of words and/or phrases that the speaker frequently uses. The vocabulary histogram 255 may be compared with a histogram of speech from the audio signal 155 to identify the speaker.

The recipient type 265 may identify the speaker as a human voice, a voicemail voice, a messaging system voice, an automated phone menu voice, or a speech recognition system voice, or the like. The speaker data 220 may be used to identify non-real-time recipients 125 from the received audio signal 170.

Figure 3C:
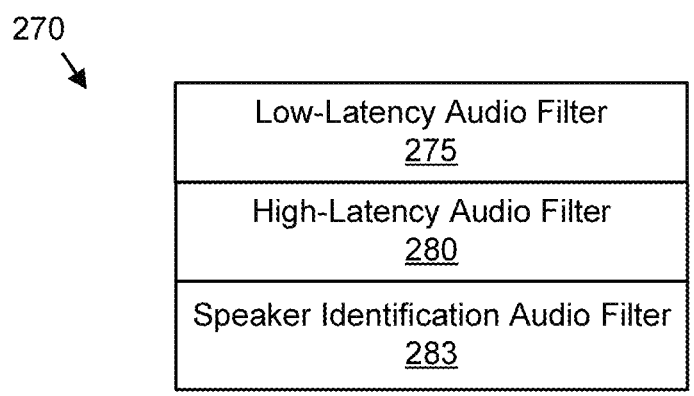
FIG. 3C is a schematic block diagram illustrating one embodiment of filters.

FIG. 3C is a schematic block diagram illustrating one embodiment of filters 270. The filters 270 include a low-latency filter 275, a high-latency filter 280, and a speaker identification filter 283.

In one embodiment, the high-latency audio filter 280 has a latency of greater than 200 milliseconds (ms). The high-latency audio filter 280 may be used for a voicemail account, a messaging system, and/or the speech recognition system. In a certain embodiment, the high-latency audio filter 280 may have a latency in the range of 50 to 200 ms for an automated phone menu. The speaker identification filter 283 may be a high-latency filter 280 as will be described hereafter.

In one embodiment, the low-latency audio filter 275 has a latency of less than 50 ms. The low-latency audio filter 275 may produce a filtered audio signal 160 with a lower signal-to-noise ratio and/or lower clarity than the high-latency audio filter 280.

Figure 4A:
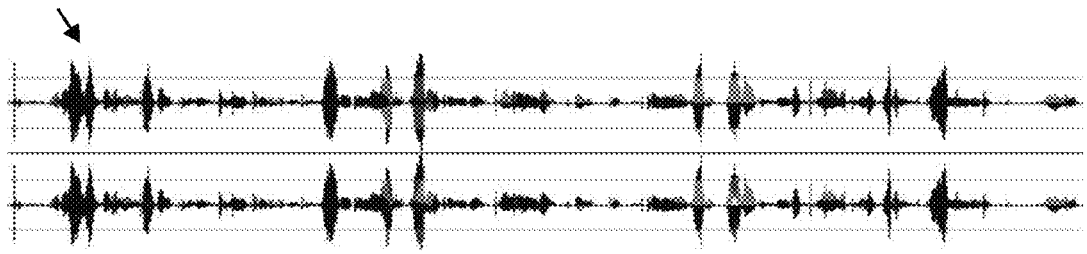
FIG. 4A is an illustration of one embodiment of an audio signal with two speakers.

FIG. 4A is an illustration of one embodiment of an audio signal 285 with two speakers. In the depicted embodiment, the microphone 105 receives audible signals from the two speakers. As a result, the audio signal 285 is a composite of the speech of both speakers, and other noise. In the depicted embodiment, the audio signals 285 are stereo signals.

Figure 4B:
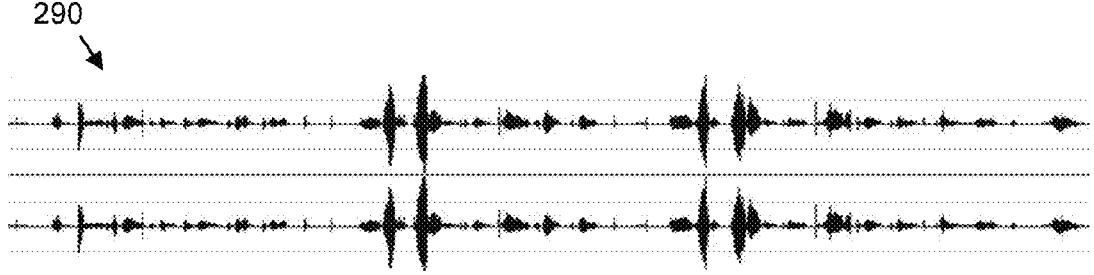
FIG. 4B is an illustration of one embodiment of an audio signal for a first speaker.
Figure 4C:
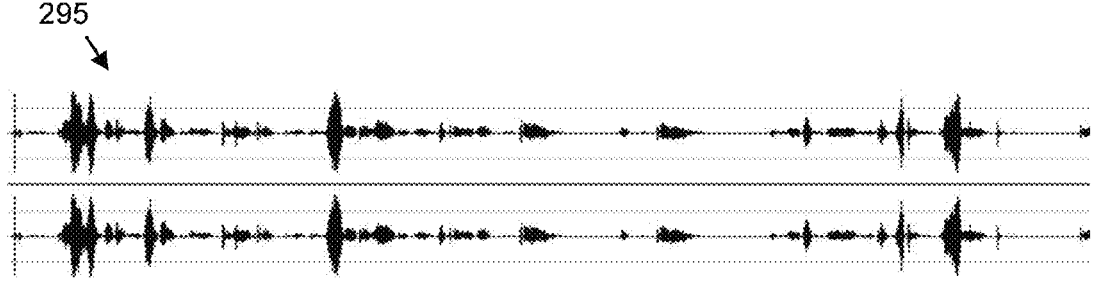
FIG. 4C is an illustration one embodiment of removed audio signals.

FIG. 4B is an illustration of one embodiment of the audio signal 290 for the first speaker. The speaker data 220 may be used to identify the audio signal 155 of the first speaker. As a result, the audio signal for the second speaker and other background noise 295, as illustrated in FIG. 4C, is removed from the filtered audio signal 290.

Figure 5:
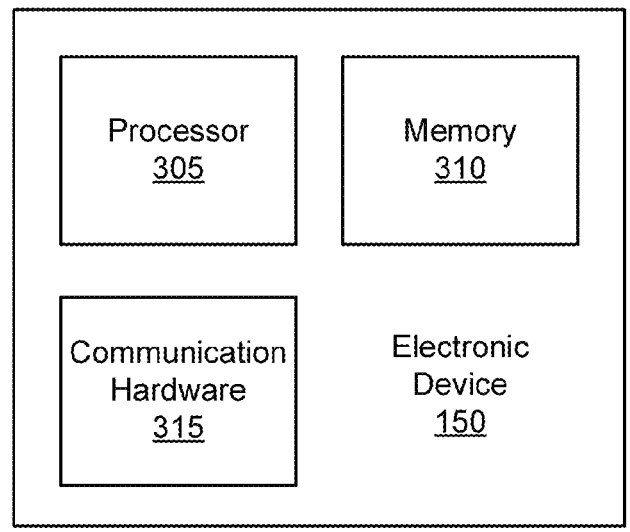
FIG. 5 is a schematic block diagram illustrating one embodiment of an electronic device 150.

FIG. 5 is a schematic block diagram illustrating one embodiment of an electronic device 150. The electronic device 150 includes a processor 305, a memory 310, and communication hardware 315. The memory 310 may be a semiconductor storage device, a hard disk drive, an optical storage device, a micromechanical storage device, or combinations thereof. The memory 310 may store program code. The program code may be executed by the processor 305 to perform functions. The communication hardware 315 may communicate with other devices such as the network 115.

Figure 6:
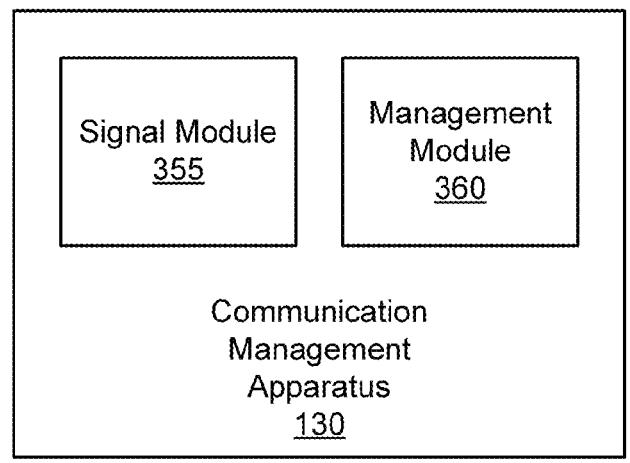
FIG. 6 is a schematic block diagram illustrating one embodiment of a communication management apparatus.

FIG. 6 is a schematic block diagram illustrating one embodiment of the communication management apparatus 130. The apparatus 130 may be embodied in the electronic device 150. The apparatus 130 includes a signal module 355 and a management module 360. The signal module 355 and the management module 360 may be embodied in a computer readable storage device such as the memory 310. The computer readable storage device may store program code is executable by the processor 305 to perform the functions of the signal module 355 and the management module 360.

In one embodiment, the signal module 355 detects the communication of the audio signal 155 and/or the filtered audio signal 160 to a non-real-time recipient 125. The management module 360 may filter the audio signal 155 with a high-latency audio filter in response to detecting the communication of the audio signal 155 and/or the filtered audio signal 160 to the non-real-time recipient 125 as will be described hereafter.

Figure 7:
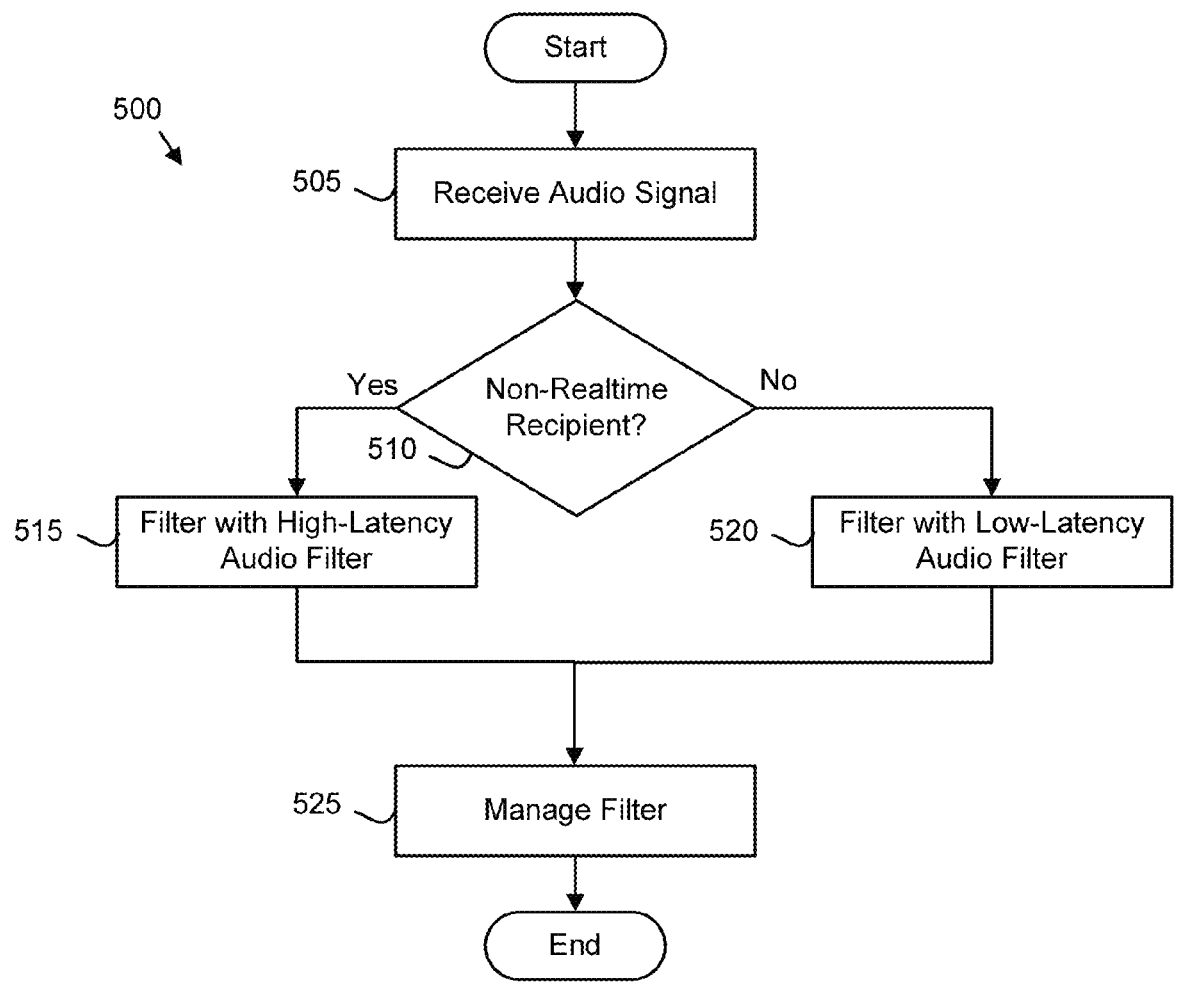
FIG. 7 is a schematic flow chart diagram illustrating one embodiment of a communication management method.

FIG. 7 is a schematic flow chart diagram illustrating one embodiment of a communication management method 500. The method 500 may perform the functions of the system 100 and apparatus 130. In one embodiment, the method 500 is performed by use of the processor 305. Alternatively, the method 500 may be embodied in a program product. The program product may comprise a computer readable storage medium such as the memory 310. The computer readable storage medium may store program code that is executable by the processor 305 to perform the functions of the method 500.

The method 500 starts, and in one embodiment, the signal module 355 receives 505 the audio signal 155. In one embodiment, the signal module 355 receives the audio signal 155 from the analog-to-digital converter 110. In an alternative embodiment, the signal module 355 receives 505 the audio signal 155 for the microphone 105.

The signal module 355 determines 510 if the recipient 125 is a non-real-time recipient 125. The signal module 355 may determine 510 that the recipient 125 is a non-real-time recipient 125 by identifying one or more automation phrases 205 in the received audio signal 170. For example, the signal module 355 may compare the received audio signal 170 with the one or more automation phrases 205 and determine that the recipient 125 is a non-real-time recipient 125 if there is a match. The automation phrases 205 may be stored as phonemes in one or more standard dialects. The signal module 355 may compare the received signal 170 to the phonemes 235 in order to identify a match.

Alternatively, the signal module 355 may determine that the recipient 125 is a non-real-time recipient 125 by identifying one or more automation phrases 205 in the audio signal 155. For example, the signal module 355 may compare the audio signal 155 with the one or more automation phrases 205 and determine that the recipient 125 is a non-real-time recipient 125 if there is a match.

In one embodiment, the signal module 355 converts the audio signal 155 and/or received audio signal 170 into text and compares the text with the automation phrases 205. The signal module 355 may identify the non-real-time recipient 125 if the text of the audio signal 155 matches the text of one or more automation phrases 205.

In one embodiment, the signal module 355 determines 510 that the recipient 125 is a real-time recipient 125 by identifying the recipient 125 from the speaker data 220. For example, the signal module 355 may compare the received audio signal 170 with the speaker data 220. If there is a match between the received audio signal 170 and the speaker data 220, the recipient type 265 may be used to determine if recipient 125 is a non-real-time recipient 125.

The signal module 355 may determine 510 that the recipient 125 is a non-real-time recipient 125 by comparing an address of the recipient 125 with the recipient addresses 260. For example, if the address of the recipient 125 matches a recipient address 260 of a known non-real-time recipient 125, the signal module 355 may determine 510 that the recipient 125 is a non-real-time recipient 125.

In one embodiment, the signal module 355 may determine that the recipient 125 is a non-real-time recipient 125 if a combined latency of the high-latency audio filter 280 and the path to the recipient 125 is less than a latency ceiling. The latency ceiling may be in the range of 50-125 ms. In one embodiment, the latency ceiling is 100 ms.

If the recipient 125 is a non-real-time recipient 125, the management module 360 may direct the audio filter 120 to filter 515 the audio signal 155 with the high-latency audio filter 280. In one embodiment, the high-latency audio filter 280 is the speaker identification filter 283. The speaker identification filter 283 may identify one or more primary speaker signals in the audio signal 155. In addition, the speaker identification filter 283 may preserve the one or more primary speaker signals and remove other audio signals.

For example, as illustrated in FIGS. 4A-C, the speaker identification filter 283 may identify a primary speaker audio signal 290 from the audio signal 285 with two or more speakers. The speaker identification filter 283 may transmit the primary speaker audio signal 290 as a filtered audio signal 160 and remove the other audio signals 295.

If the recipient 125 is a real-time recipient 125, the management module 360 may direct the audio filter 120 to filter 520 the audio signal 155 with the low-latency audio filter 275.

The management module 360 may manage 525 the audio filter 120 and the method 500 ends. In one embodiment, the management module 360 manages 525 the audio filter 120 by identifying a primary speaker signal. The management module 360 may preserve the primary speaker audio signals 290 and remove the other audio signals 295. In addition, the management module 360 may manage a change from the first primary speaker to a second primary speaker as will be described hereafter for FIG. 8.

Figure 8:
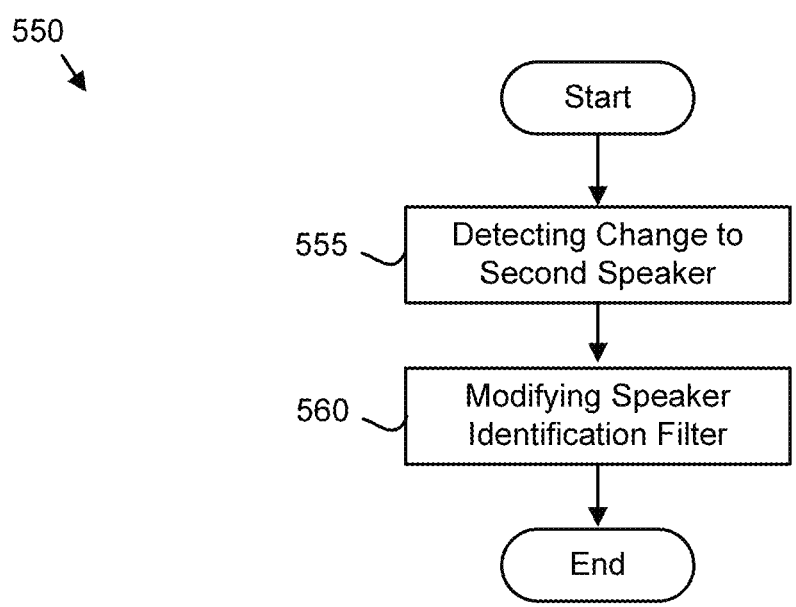
FIG. 8 is a schematic flow chart diagram illustrating one embodiment of a filter modification method.

FIG. 8 is a schematic flow chart diagram illustrating one embodiment of a filter modification method 550. The filter modification method 550 may be embodied in the manage the audio filter step 525 of FIG. 7. The method 550 may perform the functions of the system 100 and apparatus 130. In one embodiment, the method 550 is performed by use of the processor 305. Alternatively, the method 550 may be embodied in a program product. The program product may comprise a computer readable storage medium such as the memory 310. The computer readable storage medium may store program code that is executable by the processor 305 to perform the functions of the method 550.

The method 550 starts, and in one embodiment, the management module 360 detects 555 a change from the first primary speaker to a second primary speaker. The first primary speaker may have been initially identified from an amplitude of the first primary speaker's audio signal 290. For example, the first primary speaker signal 290 may have previously had a higher amplitude audio signal 155 then the amplitude of the second primary speaker signal and/or other noise 295. Alternatively, the first primary speaker may have been initially identified from the device identifier 245 for the electronic device 150.

The first primary speaker may have been using electronic device 150 and the audio filter 120 may have been filtering the audio signal 155 to preserve the primary speaker signal 290 and remove all other audio signals 295.

In one embodiment, the management module 360 detects 555 the change from the first primary speaker to the second primary speaker by employing the speaker data 220 to detect 555 the change in primary speaker. For example, the management module 360 may detect 555 a change in relative amplitudes of a first primary speaker audio signal and the second primary speaker audio signal.

In addition, the management module 360 may detect a change indicator 210 to detect 555 the change from the first primary speaker to the second primary speaker. The change indicator 210 may be the ratio of the amplitude of the second primary speaker signal to the amplitude of audio signal for the first primary speaker signal exceeding a ratio threshold. As a result, the management module 360 may detect 555 the change from the first primary speaker to the second primary speaker.

In an alternative embodiment, the management module 360 detects 555 the change from the first primary speaker to the second primary speaker by detecting a motion change indicator 210. For example, the first primary speaker may hand a mobile telephone to a second primary speaker. The motion of the handover may conform to a change indicator 210. As a result, the management module 360 may detect 555 the change.

In one embodiment, the change indicator 210 may be a specified verbal change indicator 210. The management module 360 may identify the specified change phrase 210 and detect 555 the change from the first primary speaker to the second primary speaker in response to identifying the specified change phrase. For example, the management module 360 may recognize the phrase "Let me put . . . " as a change indicator 210 and detect 555 the change from the first primary speaker to the second primary speaker from the change indicator 210.

The management module 360 may modify 560 the speaker identification filter 283 to preserve the second primary speaker signals from the second primary speaker in response to detecting 555 the change from the first primary speaker to the second primary speaker and the method 550 ends.

By detecting the communication of the audio signal 155 and/or filtered audio signal 160 to a non-real-time recipient 125, the embodiments may filter the audio signal 155 with a high-latency audio filter 280. As a result, the clarity of the filtered audio signal 160 may be improved over the filtered audio signal 160 filtered with the low-latency latency audio filter 275. In addition, the embodiments may preserve primary speaker signals 290 and remove other audio signals 295 with the speaker identification audio filter 283. The embodiments may further detect a change from the first primary speaker to a second primary speaker and modify the speaker identification audio filter 283 to preserve second primary speaker signals, further enhancing the clarity of the filtered audio signal 160.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to:
    detect communication of an audio signal to a first primary speaker
    filter the audio signal with a speaker identification filter to preserve a first primary speaker audio signal;
    detect a change from the first primary speaker to a second primary speaker from one or more of a change in relative amplitudes of the first primary speaker audio signal and a second primary speaker audio signal, a motion, and a specified change phrase; and
    modify the speaker identification audio filter to a preserve the second primary speaker audio signal.

2. The apparatus of claim 1, wherein the code is further executable by the processor to:
    detect communication of the audio signal to a non-real-time recipient, wherein the non-real-time recipient is one of a voicemail account, a messaging system, a speech recognition system, and an automated phone menu; and
    filter the audio signal with a high-latency audio filter in response to detecting the non-real-time recipient, wherein a combined latency of the high-latency audio filter and a path to the non-real-time recipient is less than a latency threshold.

3. The apparatus of claim 2, wherein the speaker identification audio filter that preserves one or more primary speaker audio signals and removes other audio signals.

4. A method comprising:
    detecting, by use of a processor, communication of an audio signal to a first primary speaker
    filtering the audio signal with a speaker identification filter to preserve a first primary speaker audio signal;
    detecting a change from the first primary speaker to a second primary speaker from one or more of a change in relative amplitudes of the first primary speaker audio signal and a second primary speaker audio signal, a motion, and a specified change phrase; and
    modifying the speaker identification audio filter to a preserve the second primary speaker audio signal.

5. The method of claim 4, wherein the method further comprises:
    detecting communication of the audio signal to a non-real-time recipient, wherein the non-real-time recipient is one of a voicemail account, a messaging system, a speech recognition system, and an automated phone menu; and
    filtering the audio signal with a high-latency audio filter in response to detecting the non-real-time recipient, wherein a combined latency of the high-latency audio filter and a path to the non-real-time recipient is less than a latency threshold.

6. The method of claim 5, wherein the low-latency audio filter has a latency of less than 50 milliseconds.

7. The method of claim 5, wherein the non-real-time recipient is detected from a specified automation phrase.

8. The method of claim 5, wherein the speaker identification audio filter that preserves one or more primary speaker audio signals and removes other audio signals.

9. The method of claim 8, wherein the one or more primary speaker audio signals are identified from one or more of phonemes, prosodic attributes, and frequency profiles.

10. The method of claim 5, wherein the high-latency audio filter has a latency of greater than 200 milliseconds for a voicemail account, messaging system, and a speech recognition system.

11. The method of claim 5, wherein the high-latency audio filter has a latency in the range of 50-200 milliseconds for an automated phone menu.

12. A program product comprising a non-transitory computer readable storage medium storing code executable by a processor to perform:
    detecting communication of an audio signal to a first primary speaker
    filtering the audio signal with a speaker identification filter to preserve a first primary speaker audio signal;
    detecting a change from the first primary speaker to a second primary speaker from one or more of a change in relative amplitudes of the first primary speaker audio signal and a second primary speaker audio signal, a motion, and a specified change phrase; and
    modifying the speaker identification audio filter to a preserve the second primary speaker audio signal.

13. The program product of claim 12, wherein the processor further performs:
    detecting communication of the audio signal to a non-real-time recipient, wherein the non-real-time recipient is one of a voicemail account, a messaging system, a speech recognition system, and an automated phone menu; and
    filtering the audio signal with a high-latency audio filter in response to detecting the non-real-time recipient, wherein a combined latency of the high-latency audio filter and a path to the non-real-time recipient is less than a latency threshold.

* * * * *